United States Patent
Asaeda et al.

(10) Patent No.: US 6,535,406 B1
(45) Date of Patent: Mar. 18, 2003

(54) THREE-LEVEL INVERTER CONTROLLER REDUCING COMMUTATION LOOP INDUCTANCE

(75) Inventors: Takeaki Asaeda, Tokyo (JP); Hiroshi Masunaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/093,728

(22) Filed: Mar. 11, 2002

(30) Foreign Application Priority Data

Sep. 13, 2001 (JP) ........................ 2001-277805

(51) Int. Cl.[7] ......................................... H02M 7/5387
(52) U.S. Cl. ................................................. 363/98
(58) Field of Search ............................. 363/56.02, 98, 363/132

(56) References Cited

U.S. PATENT DOCUMENTS

| | | | | |
|---|---|---|---|---|
| 5,321,599 A | * | 6/1994 | Tanamachi et al. | 363/41 |
| 5,355,297 A | * | 10/1994 | Kawabata et al. | 363/98 |
| 5,375,050 A | * | 12/1994 | Nakata et al. | 363/96 |
| 5,467,262 A | * | 11/1995 | Nakata et al. | 363/98 |
| 5,627,742 A | * | 5/1997 | Nakata et al. | 363/98 |
| 5,917,721 A | * | 6/1999 | Kerkman et al. | 363/98 |

OTHER PUBLICATIONS

Bruckner et al., "Loss Balancing In Three–Level Voltage Source Inverters Applying Active NPC Switches", PESC 2001, pp. 1135–1140, Aug. 2001.

Mertens et al., "Medium Voltage Inverter Using High–Voltage IGBTs", EPE Dec. 1999, pp. 1–10.

* cited by examiner

Primary Examiner—Jeffrey Sterrett
(74) Attorney, Agent, or Firm—Leydig, Voit & Mayer, Ltd.

(57) ABSTRACT

In a gate control device for four self-arc extinction elements connected in series and two self-arc extinction elements connected in reverse parallel between the respective terminals of clamp diodes, individually, there is provided a PWM circuit that generates conduction control commands, and a gate control circuit including a delay circuit group that generates gate signals with respect to the respective self-arc extinction elements on the basis of respective conduction control commands. A pair of the self-arc extinction elements are rendered conductive at the same time, and another pair of the self-arc extinction elements are rendered conductive at the same time.

10 Claims, 9 Drawing Sheets

THREE-LEVEL INVERTER CONTROLLER REDUCING COMMUTATION LOOP INDUCTANCE

BACKGROUND OF THE INVENTION

1. Field of the Invention

The present invention relates to a device for controlling a gate of a three-level inverter using a self-arc extinction type power semiconductor element (hereinafter referred to simply as "self-arc extinction element") and a method of controlling the gate, and more particularly to a device and a method of controlling the gate of the three-level inverter that prevents the self-arc extinction element from being damaged by forming the shortest commutation loop at the time of switching operation.

2. Description of the Related Art

As a general three-level inverter, there is, for example, "Loss balancing in three-level voltage source inverters applying active NPC switches" disclosed in PESC (2001), pp. 1135 to 1140.

Referring to FIGS. 3 to 5 and Table III of the above document, self-arc extinction elements T5 and T6 are added as active NPC switches.

Also, in the case where neutral point potential of a d.c. power source is outputted to the three-level inverter, there is disclosed four kinds of gate control methods.

An object of the above-mentioned document is to average the losses generated in the self-arc extinction elements T5 and T6 that constitute the three-level inverters by appropriately selecting the four kinds of gate control methods.

Therefore, the commutation operation taking the inductance of the wiring structure within the three-level inverter into consideration is not particularly limited.

Since in the conventional device and method of controlling the gate of the three-level inverter, the commutation operation taking the inductance of the wiring structure within the three-level inverter into consideration is not devised as described, there arises such a problem that the reliability of the three-level inverter is lowered.

In particular, there arises such a problem that the self-arc extinction elements are damaged at the time of switching operation when the inductance (corresponding to the number of wiring elements) of the wiring structure that forms the commutation loop becomes large at the time of commutation between the respective self-arc extinction elements that constitute the three-level inverters.

SUMMARY OF THE INVENTION

The present invention has been made to solve the above-mentioned problems with the conventional device, and therefore an object of the present invention is to provide a device and a method of controlling a gate of a three-level inverter which reduces the inductance of a commutation loop to prevent self-arc extinction elements from being damaged by forming the shortest commutation loop at the time of commutation between the self-arc extinction elements.

A gate control device for a three-level inverter according to the present invention includes: first to third d.c. terminals having first to third potential levels; first to fourth self-arc extinction elements connected in series between the first and third d.c. terminals; first and second clamp diodes connected in reverse parallel between a node of the first and second self-arc extinction elements and a node of the third and fourth self-arc extinction elements; fifth and sixth self-arc extinction elements connected in reverse parallel between the respective both terminals of the first and second clamp diodes, individually, in which a node of the first and second clamp diodes is connected to the second d.c. terminal; a PWM circuit that generates a first conduction control command with respect to the first and third self-arc extinction elements and a second conduction control command with respect to the second and fourth self-arc extinction elements; and a gate control circuit that generates gate signals with respect to the gates of the first to sixth self-arc extinction elements on the basis of the first and second conduction control commands, wherein the gate control circuit includes: first and second inversion circuits that invert the first and second conduction control commands, individually; and a delay circuit group that generates the gate signals on the basis of the first and second conduction control commands and the inverted first and second conduction control commands, and wherein the third and fifth self-arc extinction elements are rendered conductive at the same time, and the second and sixth self-arc extinction elements are rendered conductive at the same time.

Further, a gate control device for a three-level inverter according to the present invention includes: first to fourth on-delay circuits that generate first to fourth gate signals with respect to the first to fourth self-arc extinction elements; a first series circuit including a fifth on-delay circuit that generates a fifth gate signal with respect to the fifth self-arc extinction element and a first off-delay circuit; and a second series circuit including a sixth on-delay circuit that generates a sixth gate signal with respect to the sixth self-arc extinction element and a second off-delay circuit, wherein a first dead time of the first and second off-delay circuits is set to be shorter than the dead time of the fifth and sixth on-delay circuits, wherein second dead time of the first to fourth on-delay circuit is set to be longer than the dead time of the fifth and sixth on-delay circuits, wherein the fifth self-arc extinction element starts conduction precedent to a time point at which the conduction of the third self-arc extinction element starts and ends the conduction with a delay from a time point at which the conduction of the third self-arc extinction element ends; and that the sixth self-arc extinction element starts conduction precedent to a time point at which the conduction of the second self-arc extinction element starts and ends the conduction with a delay from a time point at which the conduction of the second self-arc extinction element ends.

Further, a gate control device for a three-level inverter according to the present invention includes: a positive polarity comparator and a negative polarity comparator that generate a current polarity signal corresponding to the polarity of the output current of the three-level inverter; and third and fourth inversion circuits that invert the respective current polarity signals from the positive polarity comparator and the negative polarity comparator, individually, wherein the gate control circuit includes first to sixth selection circuits that switchingly select the gate signals in accordance with the respective current polarity signals and the respective output signals of the third and fourth inversion circuits, wherein in the case where the output current is positive, the third and fifth self-arc extinction elements are rendered conductive at the same time under control, and wherein in the case where the output current is negative, the second and sixth self-arc extinction elements are rendered conductive at the same time under control.

Further, according to a gate control device for a three-level inverter of the present invention, the gate control circuit includes: a first exclusive OR circuit that takes an exclusive logical addition of the output signal of the third on-delay circuit and the output signal of the first series circuit to generate the gate signal with respect to the gate of the fifth self-arc extinction element; and a second exclusive OR circuit that takes an exclusive logical addition of the output signal of the second on-delay circuit and the output signal of the second series circuit to generate the gate signal with respect to the gate of the sixth self-arc extinction element, wherein the fifth self-arc extinction element starts to be rendered conductive precedent to a time point at which the conduction of the third self-arc extinction element starts, holds a non-conductive state during the conduction period of the third self-arc extinction element, and is rendered conductive by the first dead time from the time point at which the conduction of the third self-arc extinction element ends, and wherein the sixth self-arc extinction element starts to be rendered conductive precedent to a time point at which the conduction of the second self-arc extinction element starts, holds a non-conductive state during the conduction period of the second self-arc extinction element, and is rendered conductive by the first dead time from the time point at which the conduction of the second self-arc extinction element ends.

Further, according to a gate control device for a three-level inverter of the present invention, the gate control circuit includes: fifth and sixth inversion circuits that invert the output signals of the second and third on-delay circuits, individually; a first AND circuit that takes the logical product of the output signal of the first series circuit and the output signal of the fifth inversion circuit; a first OR circuit that takes the logical addition of the output signal of the first exclusive OR circuit and the output signal of the first AND circuit to generate the gate signal with respect to the gate of the fifth self-arc extinction element; a second AND circuit that takes the logical product of the output of the second series circuit and the output signal of the sixth inversion circuit; and a second OR circuit that takes the logical addition of the output signal of the second exclusive OR circuit and the output signal of the second AND circuit to generate the gate signal with respect to the gate of the sixth self-arc extinction element, wherein the fifth self-arc extinction element starts to be rendered conductive precedent to a time point at which the conduction of the third self-arc extinction element starts, holds a non-conductive state except for a period of time during which the first and second self-arc extinction elements are rendered nonconductive at the same time, and is rendered conductive by the first dead time from the time point at which the conduction of the third self-arc extinction element ends, and wherein in the sixth self-arc extinction element starts to be rendered conductive precedent to a time point at which the conduction of the second self-arc extinction element starts, holds a non-conductive state except for a period of time during which the third and fourth self-arc extinction elements are rendered nonconductive at the same time, and is rendered conductive by the first dead time from the time point at which the conduction of the second self-arc extinction element ends.

Further, according to a gate control method for a three-level inverter, the device includes: first to third d.c. terminals having first to third potential levels; first to fourth self-arc extinction elements connected in series between the first and third d.c. terminals; first and second clamp diodes connected in reverse parallel between a node of the first and second self-arc extinction elements and a node of the third and fourth self-arc extinction elements; and fifth and sixth self-arc extinction elements connected in reverse parallel between the respective both terminals of the first and second clamp diodes, individually, in which a node of the first and second clamp diodes is connected to the second d.c. terminal, the method comprising the step of rendering the third and fifth self-arc extinction elements conductive at the same time, and rendering the second and sixth self-arc extinction elements conductive at the same time.

Further, a gate control method for the three-level inverter according to the present invention comprises the steps of: starting the conduction of the fifth self-arc extinction element precedent to a time point at which the conduction of the third self-arc extinction element starts and ending the conduction of the fifth self-arc extinction element with a delay from a time point at which the conduction of the third self-arc extinction element ends; and starting the conduction of the sixth self-arc extinction element precedent to a time point at which the conduction of the second self-arc extinction element starts and ending the conduction of the sixth self-arc extinction element with a delay from a time point at which the conduction of the second self-arc extinction element ends.

Further, according to a gate control method for the three-level inverter of the present invention, in the case where the output current of the three-level inverter is positive, the third and fifth self-arc extinction elements are rendered conductive at the same time under control, and wherein in the case where the output current is negative, the second and sixth self-arc extinction elements are rendered conductive at the same time under control.

Further, a gate control method for the three-level inverter according to the present invention comprises the steps of: starting the conduction of the fifth self-arc extinction element precedent to a time point at which the conduction of the third self-arc extinction element starts; holding a non-conductive state thereof during the conduction period of the third self-arc extinction element; and rendering the fifth self-arc extinction element conductive by a predetermined period of time from the time point at which the conduction of the third self-arc extinction element ends; and starting the conduction of the sixth self-arc extinction element precedent to a time point at which the conduction of the second self-arc extinction element starts; holding a non-conductive state thereof during the conduction period of the second self-arc extinction element; and rendering the sixth self-arc extinction element conductive by the predetermined period of time from the time point at which the conduction of the second self-arc extinction element ends.

Further, a gate control method for the three-level inverter according to the present invention comprises the steps of: starting the conduction of the fifth self-arc extinction element precedent to a time point at which the conduction of the third self-arc extinction element starts; holding a non-conductive state thereof except for a period of time during which the third and fourth self-arc extinction elements are rendered non-conductive at the same time; and rendering the fifth self-arc extinction element conductive by a predetermine period of time from the time point at which the conduction of the third self-arc extinction element ends; and starting the conduction of the sixth self-arc extinction element precedent to a time point at which the conduction of the second self-arc extinction elements starts; holding a non-conductive state thereof during the conduction period of the second self-arc extinction element; and rendering the sixth self-arc extinction element conductive by the predetermined period of time from the time point at which the conduction of the second self-arc extinction element ends.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.
(First Embodiment)

A first embodiment of the present invention will be given in more detail with reference to the accompanying drawings.

Figure 1:
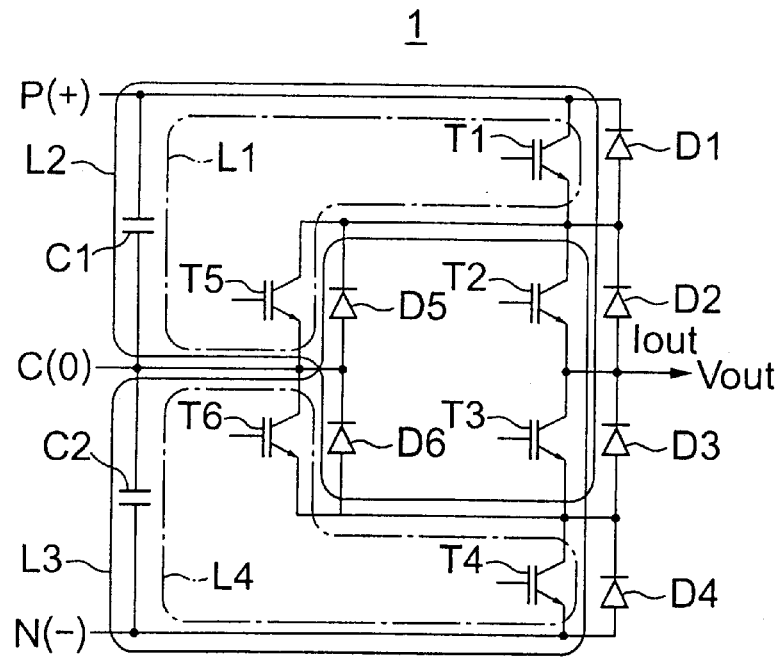
FIG. 1 is a circuit structural diagram for the explanation of a commutation loop in a gate control device for a three-level inverter in accordance with first to fifth embodiments of the present invention.

FIG. 1 is a circuit structural diagram for description of a commutation loop in accordance with the first embodiment of the present invention, and shows the structure of a main circuit of a general three-level inverter for one phase.

Referring to FIG. 1, a three-level inverter (hereinafter referred to simply as "inverter") 1 includes d.c. terminals P, C and N.

Each of the d.c. terminals P, C and N has three potentials (three levels) consisting of "+", "0" and "−".

C1 and C2 are d.c. capacitors inserted in series between the d.c. terminals P and N, where the d.c. capacitor C1 is inserted between the d.c. terminals P and C, and the d.c. capacitor C2 is connected between the d.c. terminals C and N.

Self-arc extinction elements T1, T2, T3 and T4 are connected in series between the d.c. terminals P and N, and an intermediate node between the self-arc extinction elements T2 and T3 structures an output terminal of the inverter 1 to output an a.c. voltage Vout.

Diodes D1, D2, D3 and D4 are separately connected in reverse parallel with the respective self-arc extinction elements T1, T2, T3 and T4.

A clamp diode D5 at the d.c. terminal N side is inserted between the intermediate node between the self-arc extinction elements T1 and T2 and the d.c. terminal C.

A clamp diode D6 at the d.c. terminal P side is inserted between the intermediate node between the self-arc extinction elements T3 and T4 and the d.c. terminal C.

Self-arc extinction elements T5 and T6 are separately connected in reverse parallel with the respective clamp diodes D5 and D6.

Four commutation loops L1, L2, L3 and L4 formed within the inverter 1 are switchingly formed by the on/off operation of the respective self-arc extinction elements T2, T3, T5 and T6.

Then, the basic switching forming operation of the commutation loops L1 to L4 in the inverter 1 shown in FIG. 1 will be described.

Referring to FIG. 1, the commutation loop L1 is formed at the time of commutation between the self-arc extinction element T1 (or the diode D1) and the self-arc extinction element T5 (or the clamp diode D5).

The commutation loop L1 is formed of a closed loop that passes through the d.c. capacitor C1, the self-arc extinction element T1 (or the diode D1), and the self-arc extinction element T5 (or the clamp diode D5) in the stated order.

The commutation loop L2 is formed at the time of commutation between the self-arc extinction element T1 (or the diode D1) and the self-arc extinction element T3 (or the clamp diode D3), and is formed of a closed loop that passes through the d.c. capacitor C1, the self-arc extinction element T1 (or the diode D1), the self-arc extinction element T2 (or the diode D2) , the self-arc extinction element T3 (or the diode D3) and the self-arc extinction element T6 (or the clamp diode D6) in the stated order.

The commutation loop L3 is form ed at the time of commutation between the self-arc extinction element T2 (or the diode D2) and the self-arc extinction element T4 (or the diode D4), and is formed of a closed loop that passes through the d.c. capacitor C2, the self-arc extinction element T5 (or the clamp diode D5), the self-arc extinction element T2 (or the diode D2), the self-arc extinction element T3 (or the diode D3) and the self-arc extinction element T4 (or the diode D4) in the stated order.

The commutation loop L4 is formed at the time of commutation between the self-arc extinction element T6 (or the clamp diode D6) and the self-arc extinction element T4 (or the diode D4), and is formed of a closed loop that passes through the d.c. capacitor C2, the self-arc extinction element T6 (or the clamp diode D6), and the self-arc extinction element T5 (or the clamp diode D5) in stated order.

In the disclosure of the closed loops for the respective commutation loops L1 to L4, for example, "self-arc extinction element T1 (or the diode D1)" means that any one of the self-arc extinction element T1 and the diode D1 is rendered conductive in accordance with the polarity of the output current Iout of the inverter 1.

Paying attention to the inductance of the wring structure of the commutation loops L1 to L4, the wiring structure inductance of the commutation loops L1 and L4 becomes smaller than the wiring structure inductance of the commutation loops L2 and L3 from the comparison of the number of series of the semiconductor devices (self-arc extinction elements, diodes) that form the closed loop.

Then, a specific circuit structure of the gate control device in accordance with the first embodiment of the present invention will be described with reference to the circuit structural diagram shown in FIG. 2.

Figure 2:
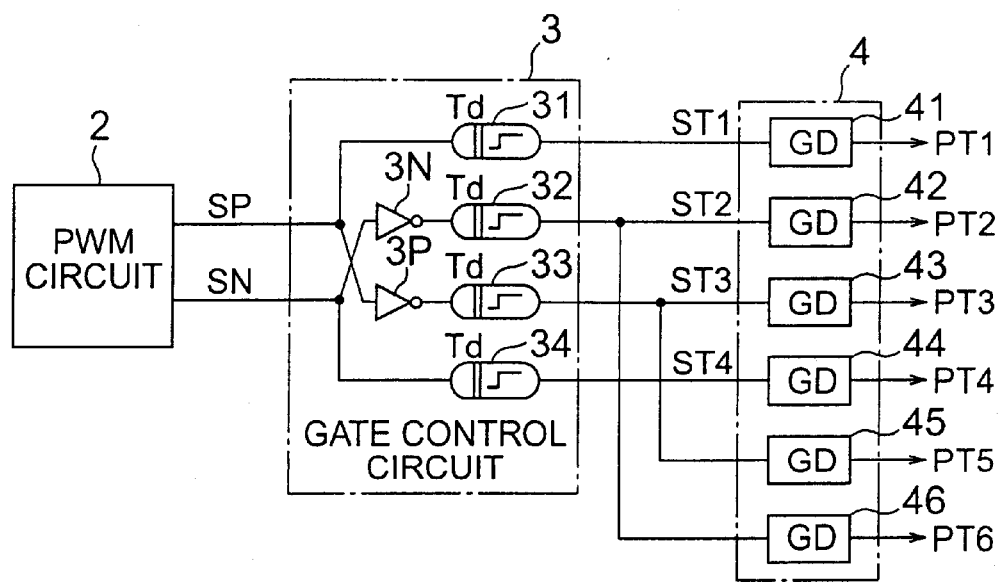
FIG. 2 is a circuit diagram showing a gate control circuit which is applied to the gate control device for the three-level inverter in accordance with the first embodiment of the present invention.

Referring to FIG. 2, a PWM circuit 2 generates a conduction control command SP with respect to the self-arc extinction elements T1 and T3 (refer to FIG. 1) on the d.c. terminal P side and a conduction control command SN with respect to the self-arc extinction elements T2 and T4 on the d.c. terminal N side.

A gate control circuit 3 connected to the PWM circuit 2 outputs gate commands ST1 to ST6 to the self-arc extinction elements T1 to T6 on the basis of the conduction control commands SP and SN.

Within the gate control circuit 3, reference symbols 3P and 3N denote inversion circuits that invert the signs of the conduction control commands SP and SN, and 31 to 34 are on-delay circuits each having a delay element of a dead time Td (in fact, Td=several tens of μs).

The on-delay circuit 31 outputs a gate signal ST1 to the self-arc extinction element T1 based on the conduction control command SP.

The on-delay circuit 32 outputs a gate signal ST2 to the self-arc extinction elements T2 and T6 on the basis of the conduction control command SN whose sign has been inverted through the inversion circuit 3N.

The on-delay circuit 33 outputs a gate signal ST3 to the self-arc extinction elements T3 and T5 on the basis of the conduction control command SP whose sign has been inverted through the inversion circuit 3P.

The on-delay circuit 34 outputs a gate signal ST4 to the self-arc extinction element T4 on the basis of the conduction control command SN.

Gate drive circuits 4 that drive the respective gates of the self-arc extinction elements T1 to T6 output on-gate pulses PT1 to PT6 to the respective self-arc extinction elements T1 to T6 on the basis of the respective gate signals ST1 to ST4 from the gate control circuit 3.

Within the gate drive circuit 4, reference numerals 41 to 46 denote gate circuits corresponding to the respective self-arc extinction elements T1 to T6.

Then, the gate control operation in accordance with the first embodiment of the present invention shown in FIG. 2 will be described with reference to FIG. 3 together with FIG. 1.

Figure 3:
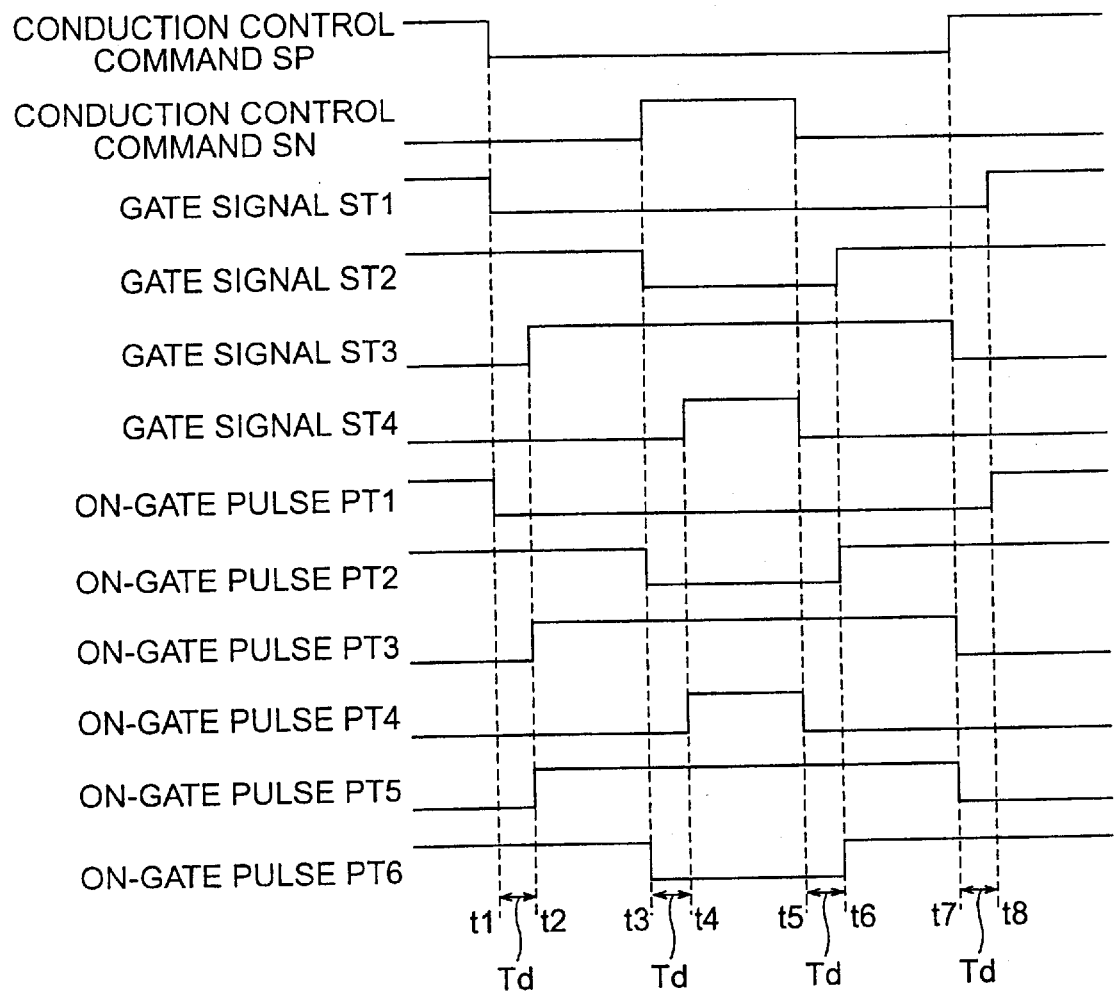
FIG. 3 is a timing chart for the explanation of the operation of the gate control device for the three-level inverter in accordance with the first embodiment of the present invention.

FIG. 3 is a timing chart showing the operation of the gate control circuit 3 shown in FIG. 2.

Referring to FIG. 3, the stationary operation logic (except for the commutation time) of the conduction control commands SP and SN outputted from the PWM circuit 2 has the following three modes "P", "0" and "N" with respect to the output voltage Vout of the inverter 1.

The first mode "P" is a mode in the case of SP=1 and SN=0 (a state before a time t1), where the self-arc extinction elements T1 and T2 turn on, and the output voltage Vout of the inverter 1 is a + potential.

The second mode "0" is a mode in the case of SP=0 and SN=0 (a state at times t1 to t3 and times t5 to t7), where the self-arc extinction elements T2, T3, T5 and T6 turn on, and the output voltage Vout of the inverter 1 is a "0" potential.

The third mode "N" is a mode in the case of SP=0 and SN=1 (a state at times t3 to t5), where the self-arc extinction elements T3 and T4 turn on, and the output voltage Vout of the inverter 1 is a "−" potential.

As described above, in a period of time before the time t1, the mode is the first mode "P" (SP=1, SN=0, and ST1=ST2=1), and the on-gate pulses PT1 and PT2 are given to the self-arc extinction elements T1 and T2.

In the case of ST2=1, the on-gate pulse PT6 is given to the self-arc extinction element T6, but since the self-arc extinction elements T3 and T4 are turned off, the output current Iout does not flow.

Thereafter, at the time t1, when SP=0 is satisfied, although ST becomes 0, the state of ST2=1 is continued.

Subsequently, at the time t2 corresponding to the on-operation delay time Td of the on-delay circuit 33, ST3 becomes 1, and the on-gate pulses PT3 and PT5 are given to the self-arc extinction elements T3 and T5, respectively.

In this example, assuming that the polarity of the output current Iout of the inverter 1 (refer to FIG. 1) is positive, in the case where the output current Iout is negative in a period of the times t1 to t2, the output current Iout flows in the d.c. terminal P through the diodes D2 and D1.

At the time t2, when the self-arc extinction elements T3 and T5 turn on, the commutation loops L1 and L2 occur at the same time. In this situation, if the diode D1 is inversely restored, the output current Iout flows so as to be distributed to a path of the diode D2, the self-arc extinction element T5 and the d.c. terminal C in the stated order and a path of the self-arc extinction element T3, the clamp diode D6 and the d.c. terminal C in the stated order.

In this example, as described above, since the wiring structure inductance of the commutation loop L1 is smaller than that of the commutation loop L2, a current flowing in the self-arc extinction element T5 within the commutation loop L1 becomes larger than a current flowing in the self-arc extinction element T3 within the commutation loop L2.

Also, the inductance of the commutation loops that are equivalently in parallel with each other can be lessened as compared with the inductance of the commutation loop L2 in the case where no self-arc commutation element T5 is provided.

Subsequently, in a period of the times t2 to t3, the mode is the second mode "0" (SP=0, SN=0, and ST2=ST3=1), and the on-gate pulses PT2, PT3, PT5 and PT6 are given to the self-arc extinction elements T2, T3, T5 and T6, respectively.

Then, at the time t3, when SP=0 and SN=1 are satisfied, ST2 becomes 0, and the self-arc extinction elements T2 and T6 are turned off.

In this situation, in the case where the output current Iout is positive, the currents that have distributedly flown into the path that passes through the d.c. terminal C, the clamp diode D5 and the self-arc extinction element T2 in the stated order and the path that passes through the d.c. terminal C, the self-arc extinction element T6 and the diode D3 in the stated order commutate in a path that passes through the d.c. terminal N, the diode D4 and the diode D3 in the stated order due to the commutation loops L3 and L4.

Also, the inductance of the commutation loops that are equivalently in parallel with each other can be lessened as compared with the inductance of the commutation loop L3 in the case where no self-arc commutation element T6 is provided.

Subsequently, at the time t4 corresponding to the on operation delay time Td of the on-delay circuit 34, ST4 becomes 1, and the on-gate pulse PT4 is given to the self-arc extinction element T4.

In this situation, since the on-gate pulses PT3, PT4 and PT5 are given to the self-arc extinction elements T3, T4 and T5, the mode is in a state of the third mode "N".

Then, at the time t5, if SN=0 is satisfied, ST4 becomes 0, and the self-arc extinction element T4 is turned off.

Subsequently, at the time t6 corresponding to the on-operation delay time Td of the on-delay circuit 32, ST2 becomes 1, and the on-gate pulses PT2 and PT6 are given to the self-arc extinction elements T2 and T6.

In this example, in the case where the output current Iout is positive and flows in the path that passes through the d.c. terminal N, the diode D4 and the diode D3 immediately before the time t6, when the self-arc extinction elements T2 and T6 turn on, the output current Iout commutates to the distributed paths consisting of a path that passes through the d.c. terminal C, the clamp diode D5 and the self-arc extinction element T2 and a path that passes through the d.c. termnal C, the self-arc extinction element T6 and the diode D3 due to the commutation loops L3 and L4.

Therefore, the inductance of the commutation loops that are equivalently in parallel with each other can be lessened as compared with the inductance of the commutation loop L2 in the case where no self-arc commutation element T5 is provided.

Then, at the time t7, when SP becomes 1, ST3 becomes 0, and the self-arc extinction elements T3 and T5 are turned off.

In this situation, in the case where the output current Iout is negative, the current is commutated to a path that passes through the diode D2, the diode D1 and the d.c. terminal P in the stated order due to the commutation loops L1 and L2, from the state where the current flows in the distributed paths consisting of the path that passes through the diode D2, the self-arc extinction element T5 and the d.c. terminal C and the path that passes through the self-arc extinction element T3, the clamp diode D6 and the d.c. terminal C.

Accordingly, the inductance of the commutation loops that are equivalently in parallel with each other can be lessened as compared with the inductance of the commutation loop L2 in the case where no self-arc commutation element T5 is provided.

As described above, the self-arc extinction elements T2 and T6 are so controlled as to be rendered conductive at the same time, and the self-arc extinction elements T3 and T5 are so controlled as to be rendered conductive at the same time, so that in case of the second mode "0", the self-arc extinction elements T2, T3, T5 and T6 form a gate-on state.

As a result, since the commutation loops L1 and L2 (or the commutation loops L3 and L4) occur at the same time at the time of commutation, the inductance of the commutation loops that are in parallel with each other can be lessened, thereby being capable of preventing the self-arc extinction elements that form the commutation loop from being damaged.

(Second Embodiment)

In the above-mentioned first embodiment, the dead times Td of the respective on-delay circuits 31 to 34 are set to a constant value, but the different dead times may be set so as to shift the on/off timing of the respective self-arc extinction elements T4 to T6.

Figure 4:
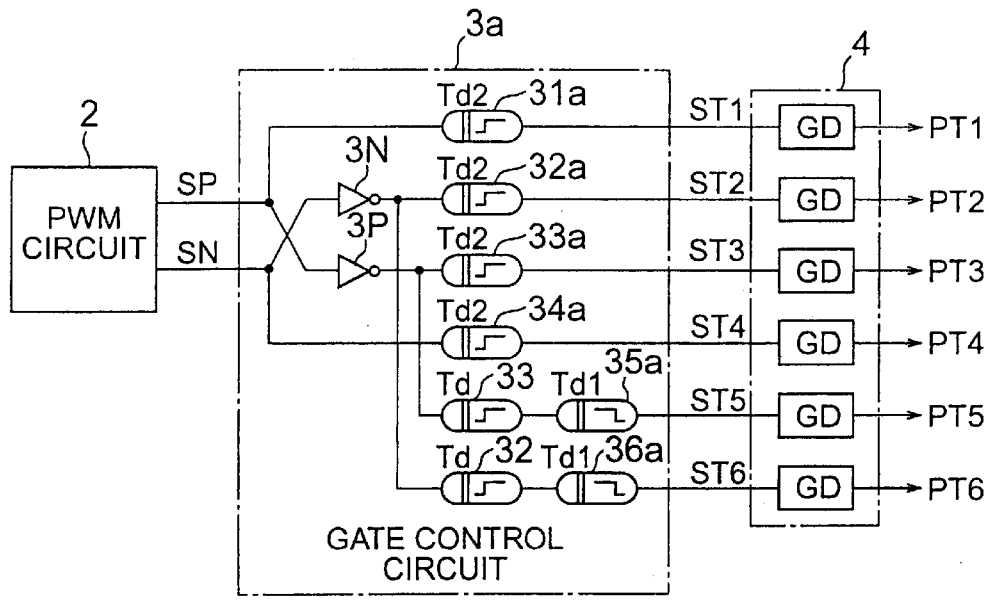
FIG. 4 is a circuit diagram showing a gate control circuit which is applied to the gate control device for the three-level inverter in accordance with the second embodiment of the present invention.

FIG. 4 is a block diagram showing the gate control device in which the on/off timings of the self-arc extinction elements T4 to T6 are shifted in accordance with a second embodiment of the present invention, and the same parts as those described in the first embodiment (refer to FIG. 2) are designated by like reference numerals or added with "a" following the reference numeral, and their description will be omitted.

Referring to FIG. 4, a gate control circuit 3a connected to the PWM circuit 2 outputs gate commands ST1 to ST6 with respect to the self-arc extinction elements T1 to T6 on the basis of the conduction control commands SP and SN.

Within the gate control circuit 3a, reference symbols 31a to 34a denote on-delay circuits each having a delay element of a second dead time Td2 (>Td), 32 and 33 are on-delay circuits each having a delay element of a first dead time Td, and reference symbols 35a and 36a denote off-delay circuits each having a delay element of the first dead time Td1 (<Td).

The on-delay circuit 32 is connected to the output terminal of the inversion circuit 3N, and the on-delay circuit 33 is connected to the output terminal of the inversion circuit 3P.

Also, the off-delay circuits 35a and 36a are connected to the on-delay circuits 33 and 32, respectively.

The on-delay circuits 31a to 34a output the gate signals ST1 to ST4 to the self-arc extinction elements T1 to T4 on the basis of the conduction control commands SP and SN as in the above-mentioned on-delay circuits 31 to 34.

The on-delay circuit 33 and the off-delay circuit 35a output the gate signal ST5 to the self-arc extinction element T5 on the basis of the conduction control command SP whose sign has been inverted through the inversion circuit 3P.

The on-delay circuit 32 and the off-delay circuit 36a output the gate signal ST6 to the self-arc extinction element T6 on the basis of the conduction control command SN whose sign has been inverted through the inversion circuit 3N.

The respective gate signals ST1 to ST6 outputted from the gate control circuit 3a become the on-gate pulses PT1 to PT6 through the gate drive circuit 4 and are then supplied to the gates of the respective self-arc extinction elements T1 to T6.

Then, the operation of the gate control circuit 3a in accordance with the second embodiment of the present invention shown in FIG. 4 will be described with reference to a timing chart shown in FIG. 5 together with FIG. 1.

First, at the time t1, when SP becomes 0, ST1 becomes 0, and the self-arc extinction element T1 is turned off.

Subsequently, at the time T2 after the dead time Td has been elapsed from the time t1, ST5 becomes 1 by the on-delay circuit 33, and the self-arc extinction element T5 is turned on.

On the other hand, at a time t2' delayed from the time t1 by the second dead time Td2 (hereinafter referred to simply as "dead time") by the on-delay circuit 33a, ST3 becomes 1, and the self-arc extinction element T3 is turned on.

In this example, since the dead times Td and Td2 have a relationship of Td2>Td, the on time t2 of the self-arc extinction element T5 proceeds the on time t2' of the self-arc extinction element T3.

Therefore, in the case where the output current Iout is negative, when the self-arc extinction element T5 turns on at the time t2, the output current commutates to the self-arc extinction element T5 from the diode D1 due to the commutation loop L1, thereby being capable of reducing the commutation inductance.

Thereafter, when the self-arc commutation element T3 turns on at the time t2', the output current Iout distributedly flows into a path that passes through the self-arc extinction element T3 and the clamp diode D6 in the stated order.

Then, at the time t3, when SN becomes 1, ST2 becomes 0, and the self-arc extinction element T2 is turned off.

In this situation, in the case where the output current Iout is positive, the distributed current that passes through the clamp diode D5 and the self-arc extinction element T2 in the stated order commutates to the distributed path that passes through the self-arc extinction element T6 and the diode D3 in the stated order.

Thereafter, at the time t4' delayed from the time t3 by the first dead time (hereinafter referred to simply as "dead time") Td1 by the off-delay circuit 36a, ST6 becomes 0, and the self-arc extinction element T6 is turned off.

Therefore, since the output current commutates to the diode D4 by the commutation loop L4, the commutation inductance can be reduced.

Subsequently, at the time t4 after the dead time Td2 has been elapsed from the time t3 by the off-delay circuit 34a, ST4 becomes 1, and the self-arc extinction element T4 is turned on.

In this example, if the dead times Td, Td1 and Td2 have a relationship that satisfies the following expression (1), a time interval between the time t4' and the time t4 corresponds to the dead time Td.

$$Td2 - Td1 = Td \quad (1)$$

Then, at the time t5, when SN becomes 0, ST4 becomes 0, and the self-arc extinction element T4 is turned off.

Subsequently, at the time t6 after the dead time Td has been elapsed from the time t5 by the on-delay circuit 32, ST6 becomes 1, and the self-arc extinction element T6 is turned on.

At this time, in the case where the output current Iout is positive, the current is commutated to the self-arc extinction element T6 from the diode D4 due to the commutation loop L4, and thus the commutation inductance can be reduced.

Subsequently, at the time t4 after the dead time Td2 has been elapsed from the time t5 by the on-delay circuit 32a, ST2 becomes 1, and the self-arc extinction element T2 is turned on.

As a result, the output current Iout is distributed to a path that passes through the clamp diode D5 and the self-arc extinction element T2 in the stated order from the path that passes through the self-arc extinction element T6 and the diode D3 in the stated order.

Then, at the time t7, when SP becomes 1, ST3 becomes 0, and the self-arc extinction element T3 is turned off.

In this situation, in the case where the output current Iout is negative, the distributed current flowing in the path that passes through the self-arc extinction element T3 and the clamp diode D6 in the stated order is commutated to a distributed path that passes through the diode D2 and the self-arc extinction element T5.

Thereafter, at the time t8' delayed by the dead time Td1 by the off-delay circuit 35a, ST5 becomes 0, and the self-arc extinction element T5 is turned off.

Therefore, since the output current commutates to the diode D1 by the commutation loop L1, the commutation inductance can be reduced.

Subsequently, at the time t8 after the dead time Td2 has been elapsed from the time t7 by the on-delay circuit 31a, ST1 becomes 1, and the self-arc extinction element T1 is turned on.

Through the above-mentioned gate control, the self-arc extinction element T5 starts to be rendered conductive precedent to a time point at which the self-arc extinction element T3 starts to be rendered conductive, and ends the conduction with a delay from a time point at which the self-arc extinction element T3 ends the conduction.

As a result, the commutation operation can be conducted by the commutation loops L1 and L4, thereby being capable of further reducing the commutation inductance.

(Third Embodiment)

In the above-mentioned second embodiment, the gate signals ST1 to ST6 are generated on the basis of only the conduction control commands SP and SN. Alternatively, the gate signals ST1 to ST6 may be switchingly generated on the basis of the polarity detected value of the output current Iout.

Figure 6:
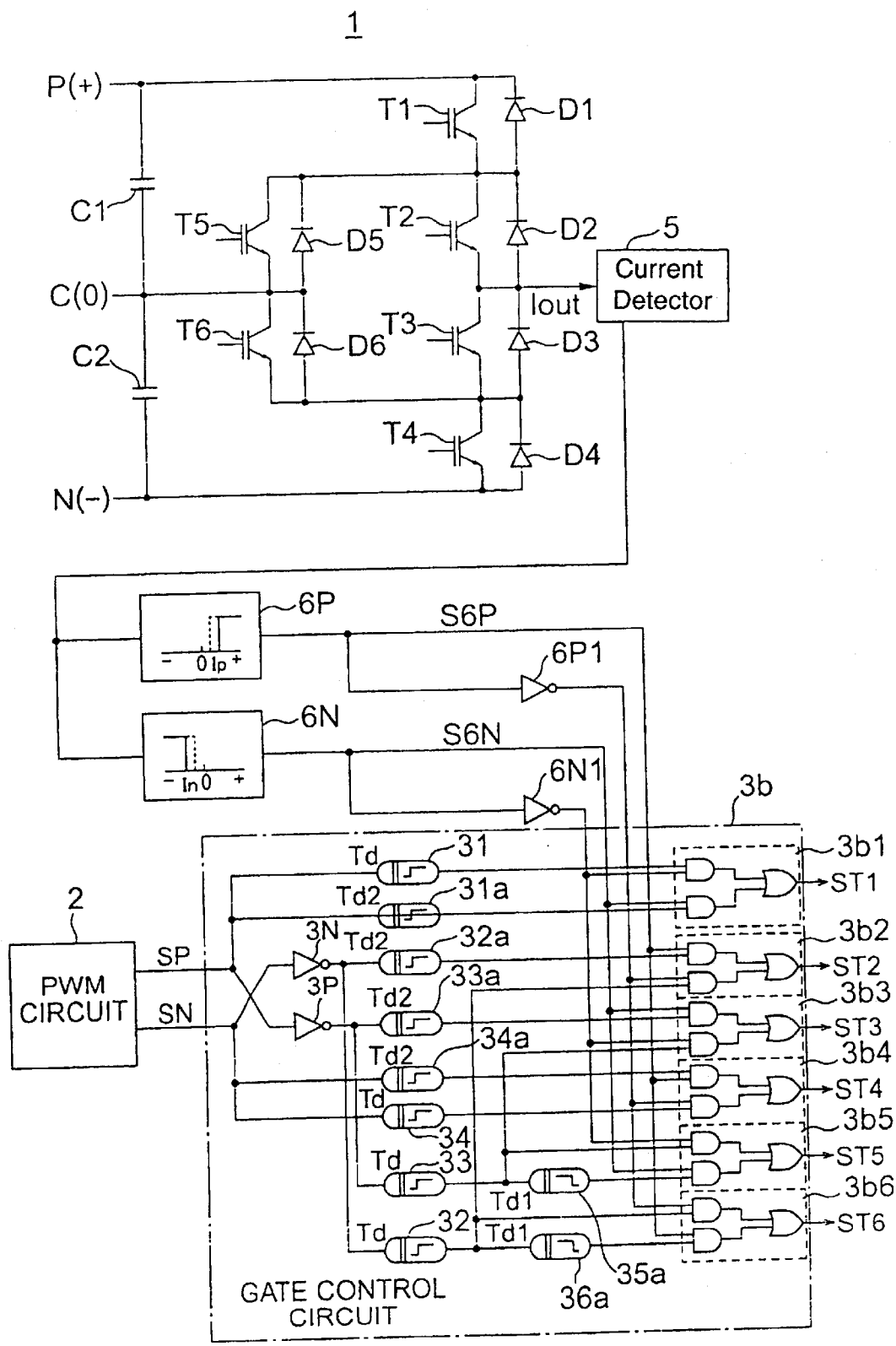
FIG. 6 is a circuit diagram showing a gate control circuit which is applied to the gate control device for the three-level inverter in accordance with the third embodiment of the present invention.

FIG. 6 is a block diagram showing a three-level inverter and a gate control device, using the polarity detected value of the output current Iout, in accordance with a third embodiment of the present invention.

In FIG. 6, the same parts as those described above (refer to FIGS. 1, 2 and 4) are designated by identical reference numerals, or "b" following the reference numeral is added, and their detailed description will be omitted. Also, in this example, for simplification of the drawings, the gate drive circuit 4 is omitted from the drawings.

Referring to FIG. 6, a gate control circuit 3b connected to the PWM circuit 2 outputs the gate commands ST1 to ST6 to the self-arc extinction elements T1 to T6 on the basis of the conduction control commands SP, SN and the output current Iout.

In this case, not only the conduction control commands SP and SN but also current polarity signals S6P, S6N and the inversion signals of the respective current polarity signals S6P, S6N are added as the input signal of the gate control circuit 3b.

Reference numeral 5 denotes a current detector that detects the output current Iout, 6P is a positive polarity comparator that discriminates the positive polarity of the output current Iout, 6N is a negative polarity comparator that discriminates the negative polarity of the output current Iout, 6P is a positive polarity comparator, 6N is a negative polarity comparator, 6P1 is an inversion circuit that inverts the current polarity signal S6P from the positive polarity comparator 6P, and 6N1 is an inversion circuit that inverts the current polarity signal S6N from the negative polarity comparator 6N.

The output signal of the current detector 5 is inputted to the positive polarity comparator 6P and the negative polarity comparator 6N.

The respective current polarity signals S6P and S6N from the positive polarity comparator 6P and the negative polarity comparator 6N are given directly to the gate control circuit 3b, and signals resulting from inverting the signs of the respective current polarity signals S6P and S6N through the respective inversion circuits 6P1 and 6N1 are given to the gate control circuit 3b.

Within the gate control circuit 3b, each of selecting circuits 3b1 to 3b6 is made up of two AND circuits disposed in parallel at the input side, and an OR circuit that takes the logical addition of the output signals of the respective AND circuits.

The gate control circuit 3b includes selection circuits 3b1 to 3b6 in addition to the on-delay circuits 31 to 34, 31a to 34a and the off-delay circuits 35a, 36a.

In the selection circuit 3b1, one of two AND circuits allows an output signal of the on-delay circuit 31a (dead time Td2) to pass therethrough in response to the negative current polarity signal S6N, and the other AND circuit allows an output signal of the on-delay circuit 31 (dead time Td) to pass therethrough in response to the inverted value of the current polarity signal S6N.

In the selection circuit 3b2, one of two AND circuits allows an output signal of the on-delay circuit 32a (dead time Td2) to pass therethrough in response to the positive current polarity signal S6P, and the other AND circuit allows an output signal of the on-delay circuit 32 (dead time Td) to pass therethrough in response to the inverted value of the current polarity signal S6P.

In the selection circuit 3b3, one of two AND circuits allows an output signal of the on-delay circuit 33a (dead time Td2) to pass therethrough in response to the negative current polarity signal S6N, and the other AND circuit allows an output signal of the on-delay circuit 33 (dead time Td) to pass therethrough in response to the inverted value of the current polarity signal S6N.

In the selection circuit 3b4, one of two AND circuits allows an output signal of the on-delay circuit 34a (dead time Td2) to pass therethrough in response to the positive current polarity signal S6P, and the other AND circuit allows an output signal of the on-delay circuit 34 (dead time Td) to pass therethrough in response to the inverted value of the current polarity signal S6P.

In the selection circuit 3b5, one of two AND circuits allows an output signal of the series circuit formed of the on-delay circuit 33 (dead time Td) and the off-delay circuit 35a (dead time Td1) to pass therethrough in response to the negative current polarity signal S6N, and the other AND circuit allows an output signal of the on-delay circuit 33 to pass therethrough in response to the inverted value of the current polarity signal S6N.

In the selection circuit 3b6, one of two AND circuits allows an output signal of the series circuit formed of the on-delay circuit 32 (dead time Td) and the off-delay circuit 36a (dead time Td1) to pass therethrough in response to the positive current polarity signal S6P, and the other AND circuit allows an output signal of the on-delay circuit 32 to pass therethrough in response to the inverted value of the current polarity signal S6P.

As described above, the respective output signals of the on-delay circuits 31 to 34, 31a to 34a, and the off-delay circuits 35a, 36a are selected in accordance with the current polarity signals S6P, S6N from the positive polarity comparator 6P and the negative polarity comparator 6N, and the respective output signals of the inversion circuits 6P1, 6N1, and the gate signals ST1 to ST6 are given to the gate drive circuit 4 (refer to FIG. 2) through the respective selection circuits 3b1 to 3b6.

The respective comparison levels of the positive polarity comparator 6P and the negative polarity comparator 6N are so set as to be isolated from 0 level in order to prevent the respective current polarity signals S6P and S6N from becoming "1" (H level) substantially at the same time due to pulsation of the output current Iout.

In other words, as shown as a characteristic waveform within a block of FIG. 6, the comparison level Ip of the positive polarity comparator 6P is so set as to be larger than the 0 level of the output current Iout, and the comparison level In of the negative polarity comparator 6N is so set as to be smaller than the 0 level of the output current Iout.

In addition, as indicated by a broken line in the block of FIG. 6, in the comparison operation of the positive polarity comparator 6P and the negative polarity comparator 6N, if a hysteresis characteristic is given to the on/off level of the comparison output, hunting can be surely prevented from occurring.

Subsequently, the operation of the gate control circuit 3b will be described with reference to the timing charts of FIGS. 7 and 8.

Figure 5:
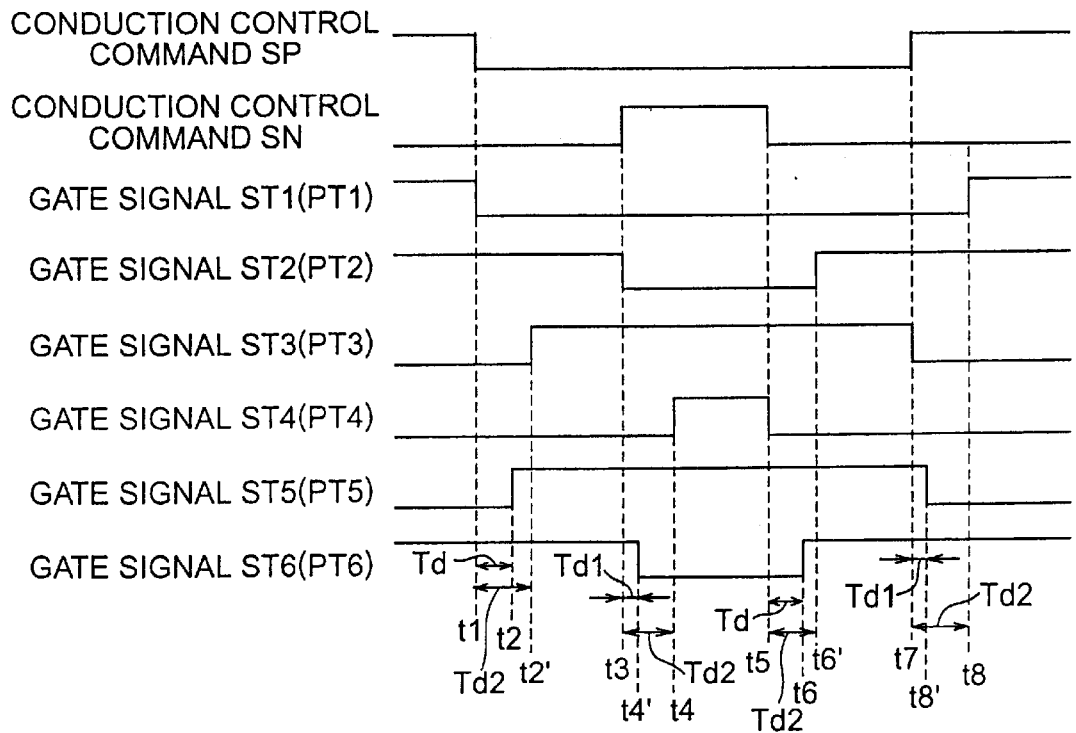
FIG. 5 is a timing chart for the explanation of the operation of the gate control device for the three-level inverter in accordance with the second embodiment of the present invention.
Figure 7:
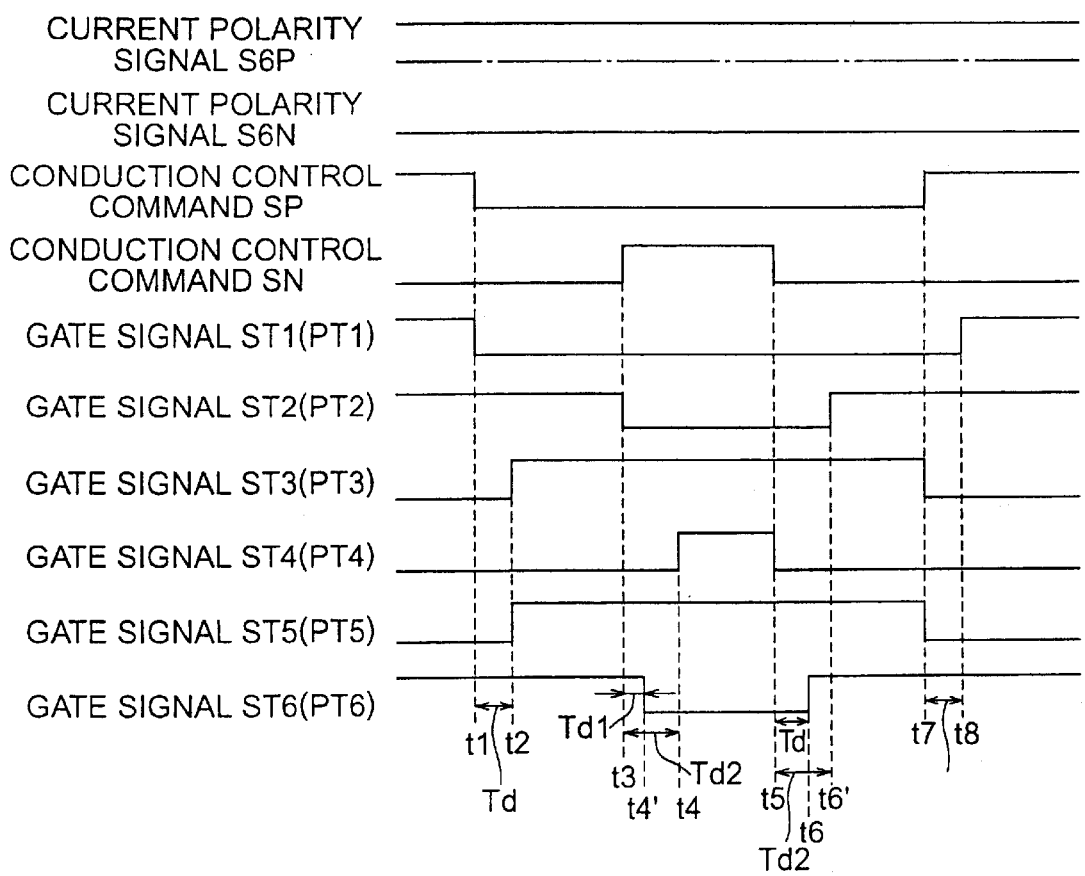
FIG. 7 is a timing chart for the explanation of the operation of the gate control device for the three-level inverter in a positive state in accordance with the third embodiment of the present invention.

FIG. 7 shows the operation of the gate control circuit 3b in the case where the output current Iout of the inverter 1 is positive, in which the gate signal ST5 corresponds to the waveform shown in FIG. 3, and the gate signal ST6 corresponds to the waveform shown in FIG. 5. In this situation, the current polarity signal S6P from the positive polarity comparator 6P is "1", and the current polarity signal S6N from the negative polarity comparator 6N is "0".

Figure 8:
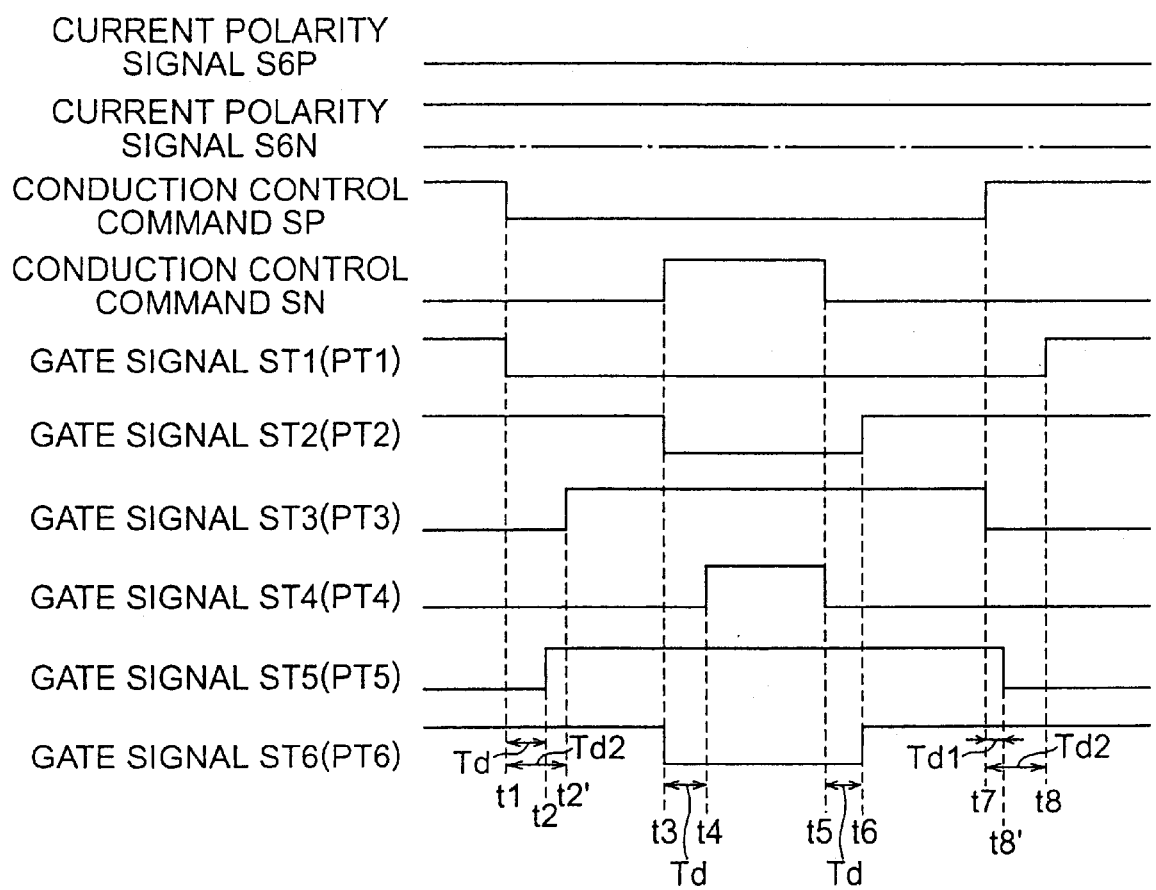
FIG. 8 is a timing chart for the explanation of the operation of the gate control device for the three-level inverter in a negative state in accordance with the third embodiment of the present invention.

Also, FIG. 8 shows the operation of the gate control circuit 3b in the case where the output current Iout of the inverter 1 is negative, in which the gate signal ST5 corresponds to the waveform shown in FIG. 5, and the gate signal ST6 corresponds to the waveform shown in FIG. 3. In this situation, the current polarity signal S6P from the positive polarity comparator 6P is "0", and the current polarity signal S6N from the negative polarity comparator 6N is "1".

First, as shown in FIG. 7, in the case where the output current Iout of the inverter 1 is positive, S6P=1, and S6N=0 are satisfied, and the selection operation of the respective gate signals ST1 to ST6 through the selection circuits 3b1 to 3b6 is as follows.

That is, the output of the on-delay circuit 31 as the gate signal ST1, the output of the on-delay circuit 32a as the gate signal ST2, the output of the on-delay circuit 33 as the gate signal ST3, the output of the on-delay circuit 34a as the gate signal ST4, the output of the on-delay circuit 33 as the gate signal ST5, and the output of the off-delay circuit 36a as the gate signal 5T6 are selected, respectively.

In this example, if the output current Iout is positive in the vicinity of the time t1 and in the vicinity of the time t7, since the diode D1 is in a nonconductive state, it is unnecessary that the self-arc extinction element T5 starts to be rendered conductive precedent to the time point at which the self-arc extinction element T3 starts to be rendered conductive, and ends the conduction with a delay from the conduction end time point of the self-arc extinction element T3 as described above (refer to FIG. 5).

Therefore, in FIG. 7, if the self-arc extinction elements T3 and T5 are rendered conductive at the same time under control as described above (refer to FIG. 3), for example, a period of time from the time t1 to the on time t2 of the self-arc extinction element T3 can be reduced to the dead time Td, thereby being capable of improving the response of the gate control with respect to the output signal of the PWM circuit 2.

On the other hand, as shown in FIG. 8, in the case where the output current Iout of the inverter 1 is negative, S6P=0 and S6N=1 are satisfied, and the selection operation of the respective gate signals ST1 to ST6 through the selection circuits 3b1 to 3b6 is as follows.

That is, the output of the on-delay circuit 31a as the gate signal ST1, the output of the on-delay circuit 32 as the gate signal ST2, the output of the on-delay circuit 33a as the gate signal ST3, the output of the on-delay circuit 34 as the gate signal ST4, the output of the off-delay circuit 35a as the gate signal ST5, and the output of the on-delay circuit 32 as the gate signal ST6 are selected, respectively.

In this example, if the output current Iout of the inverter 1 is negative in the vicinity of the time t3 and in the vicinity of the time t5, since the diode D4 is in a nonconductive state, it is unnecessary that the self-arc extinction element T6 starts to be rendered conductive precedent to the time point at which the self-arc extinction element T2 starts to be rendered conductive, and ends the conduction with a delay from the conduction end time point of the self-arc extinction element T2 as described above (refer to FIG. 5).

Therefore, in FIG. 8, if the self-arc extinction elements T2 and T6 are rendered conductive at the same time under control as described above (refer to FIG. 3), for example, a period of time from the time t5 to the time t6 at which the self-arc extinction elements T2 and T6 turn on can be reduced to the dead time Td, thereby being capable of improving the response of the gate control with respect to the output signal of the PWM circuit 2.

As described above, the gate signals ST5 and ST6 are switched in response to the positive and negative polarities of the output current Iout of the inverter 1 as shown in FIGS. 7 and 8 to realize a reduction in a period between the times t1 and t2 due to the simultaneous conduction control of the self-arc extinction elements T3 and T5, or a reduction in a period between the times t5 and t6 due to the simultaneous conduction control of the self-arc extinction elements T2 and T6, thereby being capable of improving the response of the gate control with respect to the output signal of the PWM circuit 2.

(Fourth Embodiment)

In the above-mentioned second embodiment, the outputs of the off-delay circuits 35a and 36a are inputted to the gate drive circuit 4 as they are, but may be inputted to the gate drive circuit 4 through an exclusive OR circuit.

Figure 9:
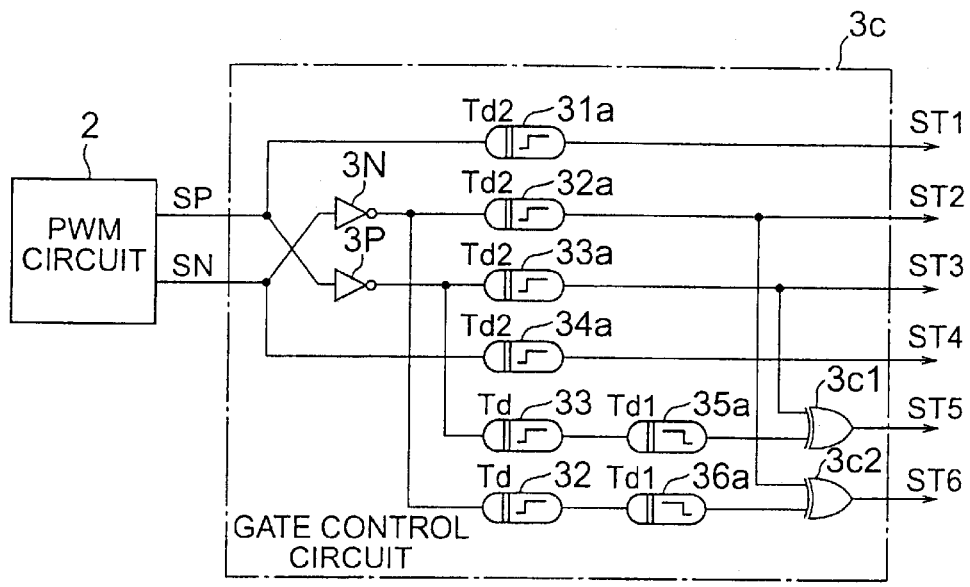
FIG. 9 is a circuit diagram showing a gate control circuit which is applied to the gate control device for the three-level inverter in accordance with the fourth embodiment of the present invention.

FIG. 9. is a block diagram showing a gate control device of a three-level inverter in which an exclusive OR circuit is disposed in accordance with a fourth embodiment of the present invention.

In FIG. 9, the same parts as those described above (refer to FIG. 4) are designated by identical reference numerals, or "c" following the reference numeral is added, and their detailed description will be omitted.

In this case, the gate control circuit 3c includes exclusive OR circuits 3c1 and 3c2 in addition to the above-mentioned structure (refer to FIG. 5), and the exclusive OR circuit 3c1 takes the exclusive logical addition of the respective output signals of the on-delay circuit 33a and the off-delay circuit 35a to generate the gate signal ST5, and the exclusive OR circuit 3c2 takes the exclusive logical addition of the respective output signals of the on-delay circuit 32a and the off-delay circuit 36a to generate the gate signal ST6.

Subsequently, the operation of the gate control circuit 3c in accordance with the fourth embodiment of the present invention shown in FIG. 9 will be described with reference to a timing chart shown in FIG. 10.

Figure 10:
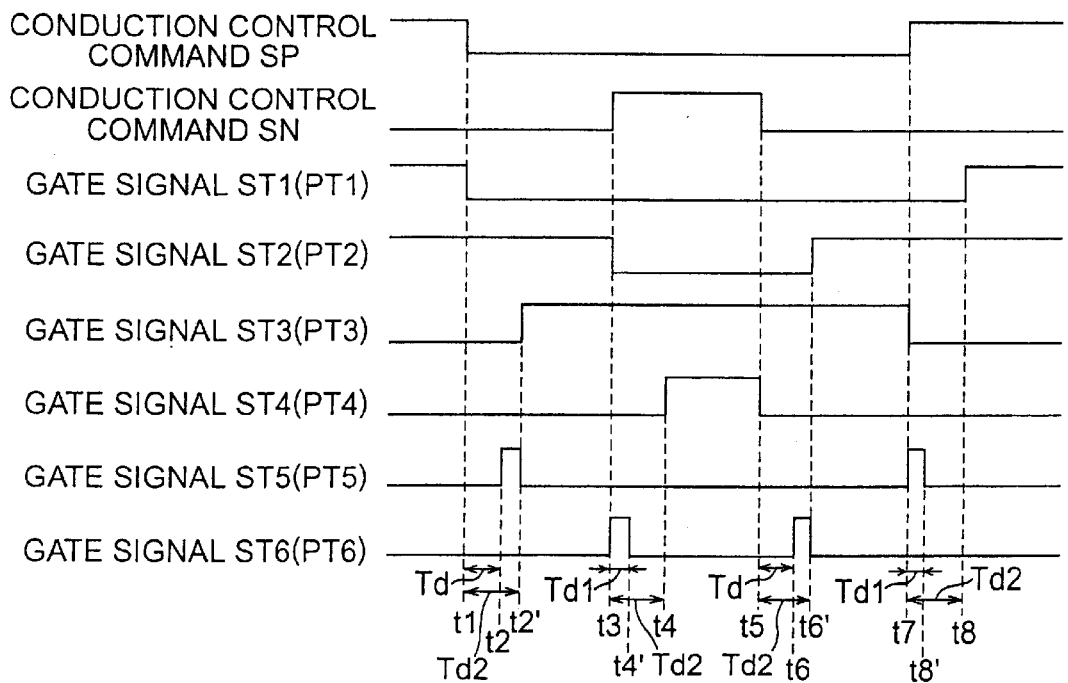
FIG. 10 is a timing chart for the explanation of the operation of the gate control device for the three-level inverter in accordance with the fourth embodiment of the present invention.

In FIG. 10, only the waveforms of the respective gate signals ST5 and ST6 are different from those described above (refer to FIG. 5).

Referring to FIG. 10, since the gate signal ST5 outputted from the exclusive OR circuit 3c1 is the exclusive logical addition of the gate signal ST3 outputted from the on-delay circuit 33a and the output signal of the off-delay circuit 35a (the gate signal ST5 shown in FIG. 5), the gate signal ST5 becomes "1" in a period of from the time t2 to the time t2' and in a period of from the time t7 to the time t8', to thereby turn on the self-arc extinction element T5.

Also, since the gate signal ST6 outputted from the exclusive OR circuit 3c2 is the exclusive logical addition of the gate signal ST2 outputted from the on-delay circuit 32a and the output signal of the off-delay circuit 36a (the gate signal ST6 shown in FIG. 5) the gate signal ST6 becomes "1" in a period of from the time t3 to the time t4' and in a period of from the time t6 to the time t6', to thereby turn on the self-arc extinction element T6.

As shown in FIG. 10, the self-arc extinction elements T5 and T6 are rendered conductive under control, thereby being capable of obtaining an inductance reduction effect at the time of commutation as described above, additionally reducing a period of time during which the on-gate pulses PT5 and PT6 occur, and reducing the power consumption of the gate drive circuit 4.

(Fifth Embodiment)

In the above-mentioned fourth embodiment, only the exclusive OR circuits 3c1 and 3c2 are added, but there may be further added a logical circuit for unifying the allotment of the voltage to the self-arc extinction elements T1 and T2 (or T3 and T4) in the case where the self-arc extinction elements T1 and T2 (or T3 and T4) give the on-gate pulse PT5 (or PT6) to the self-arc extinction element T5 (or T6) during the off gate period at the same time.

Figure 11:
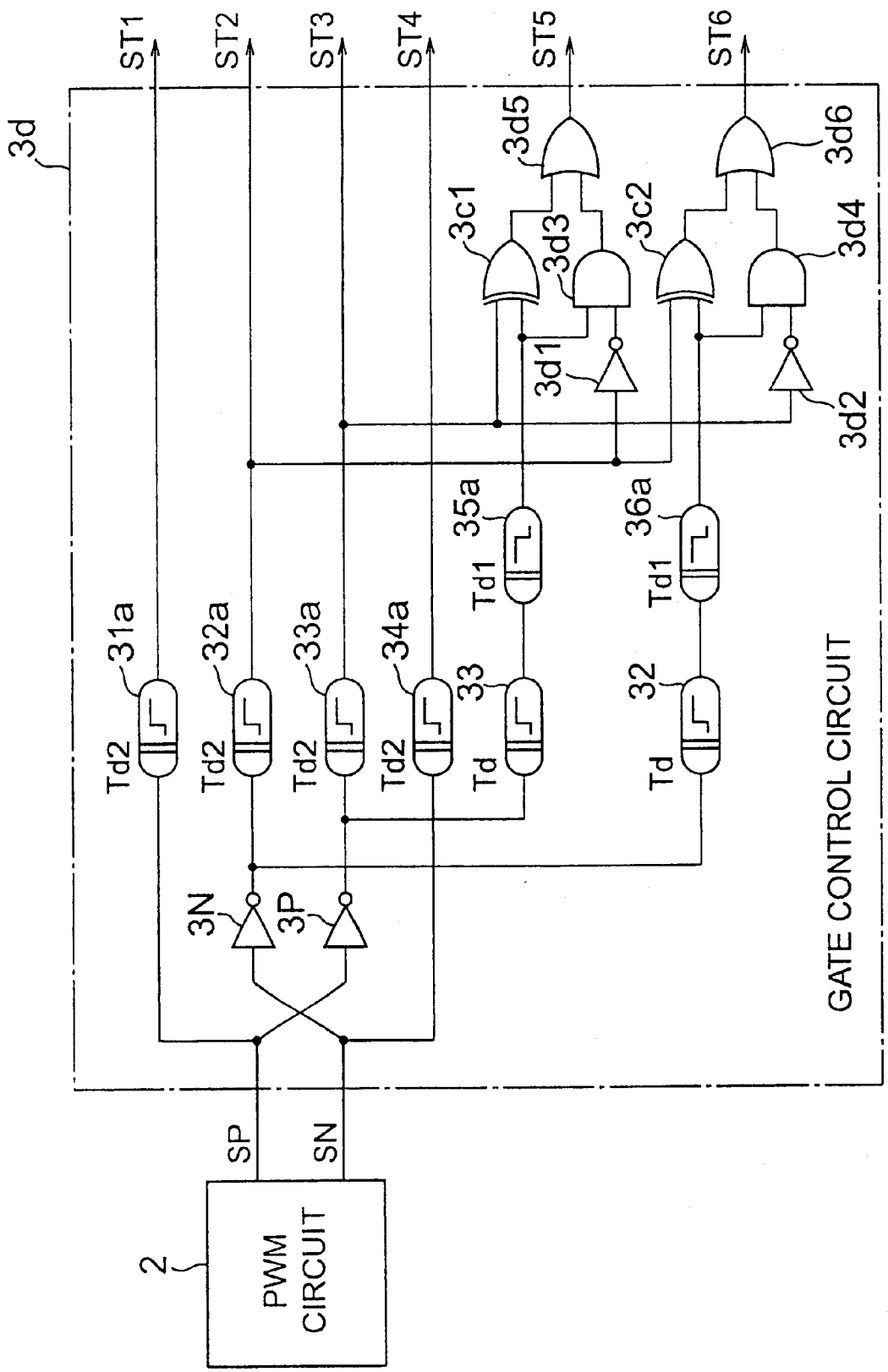
FIG. 11 is a circuit diagram showing a gate control circuit which is applied to the gate control device for the three-level inverter in accordance with the fifth embodiment of the present invention.

FIG. 11 is a block diagram showing a gate control device of a three-level inverter provided with a voltage allotment unifying logical circuit in accordance with a fifth embodiment of the present invention.

In FIG. 11, the same parts as those described above (refer to FIG. 9) are designated by identical reference numerals, or "d" following the reference numeral is added, and their detailed description will be omitted.

In this case, the gate control circuit 3d includes inversion circuits 3d1, 3d2, AND circuits 3d3, 3d4 and OR circuits 3d5, 3d6 in addition to the above-mentioned structure (refer to FIG. 9).

The inversion circuits 3d1 and 3d2 invert the respective output signals of the on-delay circuit 32a and the on-delay circuit 33a and then input the inverted output signals to the AND circuits 3d3 and 3d4, respectively.

The AND circuit 3d3 takes the logical product of the respective output signals of the off-delay circuit 35a and the inversion circuit 3d1 and inputs the logical product to the OR circuit 3d5.

The AND circuit 3d4 takes the logical product of the respective output signals of the off-delay circuit 36a and the inversion circuit 3d2 and inputs the logical product to the OR circuit 3d6.

The OR circuit 3d5 takes the logical addition of the respective output signals of the exclusive OR circuit 3c1 and the AND circuit 3d3 to generate the gate signal ST5.

The OR circuit 3d6 takes the logical addition of the respective output signals of the exclusive OR circuit 3c2 and the AND circuit 3d4 to generate the gate signal ST6.

Subsequently, the operation of the gate control circuit 3d in accordance with the fifth embodiment of the present invention shown in FIG. 11 will be described with reference to a timing chart shown in FIG. 12.

Figure 12:
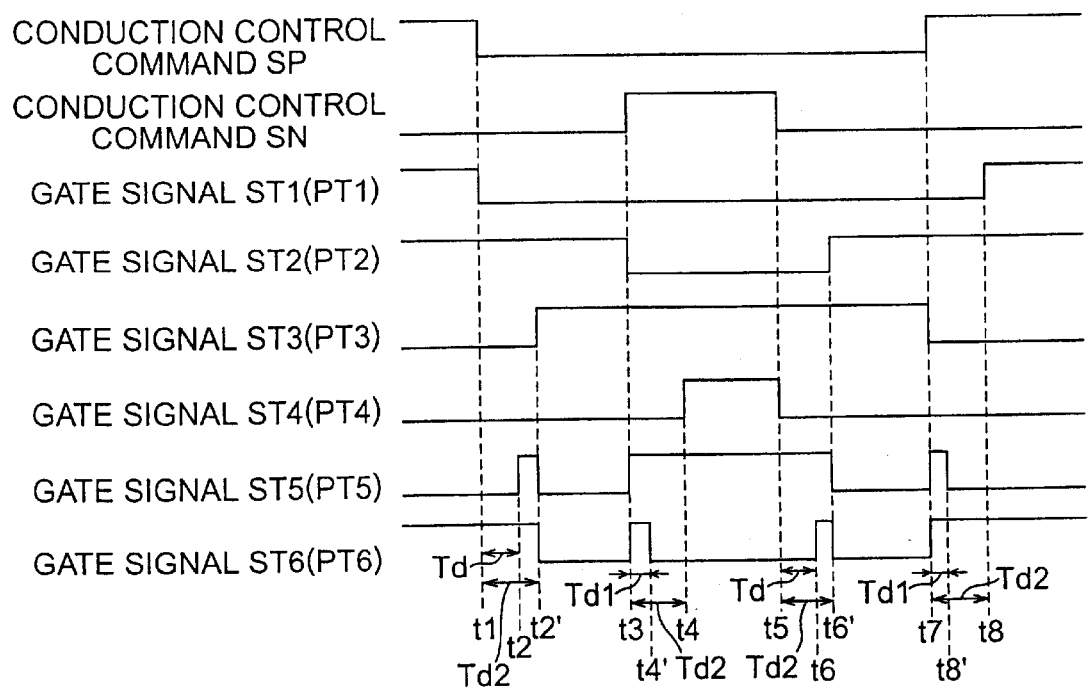
FIG. 12 is a timing chart for the explanation of the operation of the gate control device for the three-level inverter in accordance with the fifth embodiment of the present invention.

In FIG. 12, only the waveforms of the respective gate signals ST5 and ST6 are different from those described above (refer to FIGS. 5 and 10).

In this case, since the output waveform of the AND circuit 3d3 is the logical product of the output signal (the gate signal ST5 shown in FIG. 5) of the off-delay circuit 35a and the inversion signal of the output signal (the gate signal ST2) of the on-delay circuit 32a, the output waveform becomes "1" in a period of time of from the time t3 to the time t6'.

Also, since the gate signal ST5 outputted from the OR circuit 3d5 is the logical addition of the output signal (the gate signal ST5 shown in FIG. 10) of the exclusive OR circuit 3c1 and the output signal of the AND circuit 3d3, the gate signal ST5 becomes a waveform shown in FIG. 12.

On the other hand, since the output waveform of the AND circuit 3d4 is the logical product of the output signal (the gate signal ST6 shown in FIG. 5) of the off-delay circuit 36a and the inversion signal of the output signal (the gate signal ST3) of the on-delay circuit 33a, the output waveform becomes "1" in a period of time until the time t2' and a period of time subsequent to the time t7.

Also, since the gate signal ST6 outputted from the OR circuit 3d6 is the logical addition of the output signal (the gate signal ST6 shown in FIG. 10) of the exclusive OR circuit 3c2 and the output signal of the AND circuit 3d4, the gate signal ST6 becomes a waveform shown in FIG. 12.

As a result, in the case where the on-gate pulse PT5 is given to the self-arc extinction element T5 while the self-arc extinction elements T1 and T2 are in the off-gate period at the same time, the voltage allotment of the self-arc extinction elements T1 and T2 can be unified regardless of the commutation operation.

Likewise, in the case where the on-gate pulse PT6 is given to the self-arc extinction element T6 while the self-arc extinction elements T3 and T4 are in the off-gate period at the same time, the voltage allotment of the self-arc extinction elements T3 and T4 can be unified regardless of the commutation operation.

The foregoing description of the preferred embodiments of the invention has been presented for purposes of illustration and description. It is not intended to be exhaustive or to limit the invention to the precise form disclosed, and modifications and variations thereof are possible in light of the above teachings or may be acquired from practice of the invention. The embodiments were chosen and described in order to explain the principles of the invention and its practical application enables one skilled in the art to utilize the invention in various embodiments and with various modifications as are suited to the particular use contemplated. It is intended that the scope of the invention be defined by the claims appended hereto, and their equivalents.

What is claimed is:

1. A gate control device for a three-level inverter, comprising:

first, second, and third d.c. terminals having first, second, and third potential levels, respectively;

first, second, third, and fourth self-arc extinction elements connected in series between said first and third d.c. terminals;

first and second clamp diodes connected between a node of said first and second self-arc extinction elements and a node of said third and fourth self-arc extinction elements in reverse parallel with said second and third self-arc extinction elements;

fifth and sixth self-arc extinction elements connected between respective terminals of and in reverse parallel with said first and second clamp diodes, individually, in which a node of said first and second clamp diodes is connected to the second d.c. terminal;

a PWM circuit that generates a first conduction control command with respect to said first and third self-arc extinction elements and a second conduction control command with respect to said second and fourth self-arc extinction elements; and a gate control circuit that generates gate signals with respect to the gates of said first, second, third, fourth, fifth, and sixth self-arc extinction elements based on the first and second conduction control commands, wherein said gate control circuit comprises:

first and second inversion circuits that invert the first and second conduction control commands, individually, to produce inverted first and second conductive control commands; and a delay circuit group that generates the gate signals based on the first and second conduction control commands and the inverted first and second conduction control commands, and wherein said third and fifth self-arc extinction elements are rendered conductive at the same time, and said second and sixth self-arc extinction elements are rendered conductive at the same time.

2. The gate control device for a three-level inverter according to claim 1, wherein said delay circuit group comprises:

first, second, third, and fourth on-delay circuits that generate first, second, third, and fourth gate signals with respect to said first, second, third, and fourth self-arc extinction elements;

a first series circuit including a fifth on-delay circuit that generates a fifth gate signal with respect to said fifth self-arc extinction element and a first off-delay circuit; and a second series circuit including a sixth on-delay circuit that generates a sixth gate signal with respect to said sixth self-arc extinction element and a second off-delay circuit, wherein a first dead time of said first and second off-delay circuits is shorter than a dead time of said fifth and sixth on-delay circuits, a second dead time of said first, second, third, and fourth on-delay circuits is longer than dead time of said fifth and sixth on-delay circuits, said fifth self-arc extinction element starts conduction precedent to a time point at which conduction of said third self-arc extinction element starts, and ends conduction with a delay from a time point at which conduction of said third self-arc extinction element ends, and said sixth self-arc extinction element starts conduction precedent to a time point at which conduction of said second self-arc extinction element starts, and ends conduction with a delay from a time point at which conduction of said second self-arc extinction element ends.

3. The gate control device for a three-level inverter according to claim 2, further comprising:

a positive polarity comparator and a negative polarity comparator that generate a current polarity signal corresponding to polarity of output current of said three-level inverter; and third and fourth inversion circuits that invert respective current polarity signals from said positive polarity comparator and said negative polarity comparator, individually, wherein said gate control circuit includes first, second, third, fourth, fifth, and sixth selection circuits that switchingly select the gate signals in accordance with the respective current polarity signals and the respective output signals of said third and fourth inversion circuits, when the output current is positive, said third and fifth self-arc extinction elements are rendered conductive at the same time, and when the output current is negative, said second and sixth self-arc extinction elements are rendered conductive at the same time.

4. The gate control device for a three-level inverter according to claim 2, wherein said gate control circuit comprises:

a first exclusive OR circuit that takes an exclusive logical addition of the output signal of said third on-delay circuit and the output signal of said first series circuit to generate the gate signal with respect to the gate of said fifth self-arc extinction element; and a second exclusive OR circuit that takes an exclusive logical addition of the output signal of said second on-delay circuit and the output signal of said second series circuit to generate the gate signal with respect to the gate of said sixth self-arc extinction element, said fifth self-arc extinction element starts to be rendered conductive precedent to a time point at which the conduction of said third self-arc extinction element starts, holds a non-conductive state during the conduction period of said third self-arc extinction element, and is rendered conductive by the first dead time from the time point at which the conduction of said third self-arc extinction element ends, and said sixth self-arc extinction element starts to be rendered conductive precedent to a time point at which the conduction of said second self-arc extinction element starts, holds a non-conductive state during the conduction period of said second self-arc extinction element, and is rendered conductive by the first dead time from the time point at which the conduction of said second self-arc extinction element ends.

5. The gate control device for a three-level inverter according to claim 2, wherein said gate control circuit comprises:

fifth and sixth inversion circuits that invert output signals of said second and third on-delay circuits, individually;

a first AND circuit that takes the logical product of the output signal of said first series circuit and the output signal of said fifth inversion circuit;

a first OR circuit that takes the logical addition of the output signal of said first exclusive OR circuit and the output signal of said first AND circuit to generate the gate signal with respect to the gate of said fifth self-arc extinction element;

a second AND circuit that takes the logical product of the output of said second series circuit and the output signal of said sixth inversion circuit; and a second OR circuit that takes the logical addition of the output signal of said second exclusive OR circuit and the output signal of said second AND circuit to generate the gate signal with respect to the gate of said sixth self-arc extinction element, wherein said fifth self-arc extinction element starts to be rendered conductive precedent to a time point at which the conduction of said third self-arc extinction element starts, holds a non-conductive state except for a period of time during which said first and second self-arc extinction elements are rendered nonconductive at the same time, and is rendered conductive by the first dead time from the time point at which the conduction of said third self-arc extinction element ends, and said sixth self-arc extinction element starts to be rendered conductive precedent to a time point at which the conduction of said second self-arc extinction element starts, holds a non-conductive state except for a period of time during which said third and fourth self-arc extinction elements are rendered nonconductive at the same time, and is rendered conductive by the first dead time from the time point at which the conduction of said second self-arc extinction element ends.

6. A gate control method for a three-level inverter, comprising:

first, second, and third d.c. terminals having first, second, and third potential levels, respectively;

first, second, third, and fourth self-arc extinction elements connected in series between said first and third d.c. terminals;

first and second clamp diodes connected between a node of said first and second self-arc extinction elements and a node of said third and fourth self-arc extinction elements in reverse parallel with said second and third self-arc extinction elements; and fifth and sixth self-arc extinction elements connected between respective terminals of and in reverse parallel with said first and second clamp diodes, individually, in which a node of said first and second clamp diodes is connected to the second d.c. terminal, said method comprising:

rendering said third and fifth self-arc extinction elements conductive at the same time, and rendering said second and sixth self-arc extinction elements conductive at the same time.

7. The gate control method for a three-level inverter according to claim 6, further comprising:

starting the conduction of said fifth self-arc extinction element precedent to a time point at which the conduction of said third self-arc extinction element starts and ending the conduction of said fifth self-arc extinction element with a delay from a time point at which the conduction of said third self-arc extinction element ends; and starting the conduction of said sixth self-arc extinction element precedent to a time point at which the conduction of said second self-arc extinction element starts and ending the conduction of said sixth self-arc extinction element with a delay from a time point at which the conduction of said second self-arc extinction element ends.

8. The gate control method for a three-level inverter according to claim 7, wherein, when the output current of said three-level inverter is positive, said third and fifth self-arc extinction elements are rendered conductive at the same time, and when the output current is negative, said second and sixth self-arc extinction elements are rendered conductive at the same time.

9. The gate control method for a three-level inverter according to claim 7, further comprising:

starting the conduction of said fifth self-arc extinction element precedent to a time point at which the conduction of said third self-arc extinction element starts;

holding a non-conductive state thereof during the conduction period of said third self-arc extinction element;

rendering said fifth self-arc extinction element conductive by a fixed period of time from the time point at which the conduction of said third self-arc extinction element ends;

starting the conduction of said sixth self-arc extinction element precedent to a time point at which the conduction of said second self-arc extinction element starts;

holding a non-conductive-state thereof during the conduction period of said second self-arc extinction element; and rendering said sixth self-arc extinction element conductive by the fixed period of time from the time point at which the conduction of said second self-arc extinction element ends.

10. The gate control method for a three-level inverter according to claim 7, further comprising:

starting the conduction of said fifth self-arc extinction element precedent to a time point at which the conduction of said third self-arc extinction element starts;

holding a non-conductive state thereof except for a period of time during which said first and second self-arc extinction elements are rendered nonconductive at the same time;

rendering said fifth self-arc extinction element conductive by a fixed period of time from the time point at which the conduction of said third self-arc extinction element ends;

starting the conduction of said sixth self-arc extinction element precedent to a time point at which the conduction of said second self-arc extinction element starts;

holding a non-conductive state except for a period of time during which said third and fourth self-arc extinction elements are rendered nonconductive at the same time; and rendering said sixth self-arc extinction element conductive by the fixed period of time from the time point at which the conduction of said second self-arc extinction element ends.

* * * * *

UNITED STATES PATENT AND TRADEMARK OFFICE
CERTIFICATE OF CORRECTION

PATENT NO.     : 6,535,406 B1                                         Page 1 of 1
DATED          : March 18, 2003
INVENTOR(S)    : Asaeda et al.

It is certified that error appears in the above-identified patent and that said Letters Patent is hereby corrected as shown below:

<u>Column 6,</u>
Line 14, change "N side" to -- P side --;
Line 16, change "P side" to -- N side --'
Line 46, change "form ed" to -- formed --.

Signed and Sealed this

Second Day of December, 2003

JAMES E. ROGAN
*Director of the United States Patent and Trademark Office*